(12) United States Patent
Widanagamage Don et al.

(10) Patent No.: US 11,213,170 B2
(45) Date of Patent: Jan. 4, 2022

(54) KITCHEN APPLIANCE FOR SENSING FOOD AND BEVERAGE PROPERTIES

(71) Applicant: BREVILLE PTY LIMITED, Alexandria (AU)

(72) Inventors: Lochana Subasekara Widanagamage Don, Caringbah (AU); Mark Thomas, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 0 days.

(21) Appl. No.: 15/742,866

(22) PCT Filed: Jul. 6, 2016

(86) PCT No.: PCT/AU2016/000244
§ 371 (c)(1),
(2) Date: Jan. 8, 2018

(87) PCT Pub. No.: WO2017/004661
PCT Pub. Date: Jan. 12, 2017

(65) Prior Publication Data
US 2018/0368622 A1    Dec. 27, 2018

(30) Foreign Application Priority Data

Jul. 8, 2015 (AU) ................................ 2015902693

(51) Int. Cl.
*A47J 43/044* (2006.01)
*A47J 43/07* (2006.01)
*A47J 43/06* (2006.01)

(52) U.S. Cl.
CPC ........... *A47J 43/0711* (2013.01); *A47J 43/06* (2013.01); *A47J 43/07* (2013.01); *A47J 2043/04454* (2013.01); *A47J 2202/00* (2013.01)

(58) Field of Classification Search
CPC .... A47J 43/06; A47J 43/0711; A47J 43/0727; A47J 2043/04454
(Continued)

(56) References Cited

U.S. PATENT DOCUMENTS

| 5,746,114 A | 5/1998 | Harris |
| 8,529,118 B2 | 9/2013 | Davis et al. |

(Continued)

FOREIGN PATENT DOCUMENTS

| AU | 2014233605 A1 | 4/2015 |
| CN | 102160013 A | 8/2011 |

(Continued)

OTHER PUBLICATIONS

Partial Supplementary European Search Report issued in European Patent Application No. 16820557.3, dated Nov. 19, 2018.

(Continued)

*Primary Examiner* — David L Sorkin
(74) *Attorney, Agent, or Firm* — Marshall, Gerstein & Borun LLP (57) ABSTRACT

A kitchen appliance for processing content is described. The kitchen appliance comprises a body portion, a removable accessory received by the body portion, the removable accessory being in contact with the content during processing thereof; and at least one sensor incorporated into the removable accessory. The kitchen appliance also comprises a wireless transmitter associated with the removable accessory, the transmitter receiving input from the at least one sensor and transmitting parameters associated with the input; and a controller in the body portion for controlling operation of the kitchen appliance based upon the parameters. The removable accessory is a food processing attachment that rotates with a mixing action.

13 Claims, 8 Drawing Sheets

(58) Field of Classification Search
USPC .................................................. 366/197, 206
See application file for complete search history.

(56) References Cited

U.S. PATENT DOCUMENTS

| | | | |
|---|---|---|---|
| 9,049,967 | B1 | 6/2015 | Golino et al. |
| 2010/0039883 | A1* | 2/2010 | Foltyn .................... B01F 7/1605 366/142 |
| 2011/0199852 | A1* | 8/2011 | Martin .................... A47J 43/046 366/113 |
| 2012/0230149 | A1* | 9/2012 | Martin .................... A47J 43/0727 366/205 |
| 2012/0325948 | A1 | 12/2012 | Garcia et al. |
| 2014/0286120 | A1* | 9/2014 | Kolar .................... A47J 43/0727 366/142 |
| 2015/0150416 | A1 | 6/2015 | Hoare et al. |
| 2016/0095469 | A1* | 4/2016 | Gregory ................ F24C 15/166 426/233 |

FOREIGN PATENT DOCUMENTS

| | | |
|---|---|---|
| CN | 202234932 U | 5/2012 |
| CN | 103054482 A | 4/2013 |
| CN | 104486979 A | 4/2015 |
| CN | 204288000 U | 4/2015 |
| EP | 0589093 A1 | 3/1994 |
| EP | 2153887 A2 | 2/2010 |
| WO | WO-2008/155538 A2 | 12/2008 |
| WO | WO-2011/098687 A1 | 8/2011 |
| WO | WO-2012/118455 A2 | 9/2012 |
| WO | WO-2014/075923 A1 | 5/2014 |
| WO | WO-2014/201509 A2 | 12/2014 |
| WO | WO-2015/006802 A1 | 1/2015 |

OTHER PUBLICATIONS

International Search Report and Written Report for PCT/AU2016/000244, dated Sep. 30, 2016.
Extended European Search Report issued in European Patent Application No. 16820557.3, dated Feb. 22, 2019.
Office Action issued in Russian Patent Application No. 2018104577, dated Jul. 24, 2019.
Office Action issued in Russian Patent Application No. 2018104577, dated Dec. 19, 2019.
First Examination Report for Australian Patent Application No. 2016290887, dated Jun. 15, 2020.
Second Examination Report for Australian Patent Application No. 2016290887, dated Apr. 22, 2021.

* cited by examiner

KITCHEN APPLIANCE FOR SENSING FOOD AND BEVERAGE PROPERTIES

TECHNICAL FIELD

The present invention relates generally to kitchen appliances used in the preparation of food and beverage. More particularly, the present invention relates to such kitchen appliances where a property of the food or beverage being prepared is sensed.

BACKGROUND

The complexity of food and beverage preparation processes is ever increasing. However, many of those preparation processes require accurate sensing of one or more properties of the food or beverage being prepared. One such property is temperature. Many food and beverage preparation processes require a very specific temperature to be reached. That temperature is then either required to be maintained, or used as a prompt for a next preparation step to be performed. Thus, without accurate temperature sensing the success and repeatability of the preparation process is uncertain.

Some kitchen appliances, such as stand mixers, have the ability to heat its content being mixed, while other kitchen appliances, such as ice cream makers, have the ability to cool the ingredients. In order to fully control the heating or cooling process, accurate temperature sensing of the content is desirable.

There is a need for kitchen appliances being able to accurately measure properties of the food or beverage during the preparation thereof.

SUMMARY

The terms "preparation" and "processing", and variations thereof, as used herein refer to all aspects of food and/or beverage preparation including, but not limited to, grinding, cutting, kneading, milling, mixing, and cooking.

According to an aspect of the present disclosure, there is provided a kitchen appliance for processing content, the kitchen appliance comprising:
 a body portion;
 a removable accessory received by the body portion, the removable accessory being in contact with the content during processing thereof;
 at least one sensor incorporated into the removable accessory;
 a wireless transmitter associated with the removable accessory, the transmitter receiving input from the at least one sensor and transmitting parameters associated with the input; and
 a controller in the body portion for controlling operation of the kitchen appliance based upon the parameters, wherein the removable accessory is a food processing attachment that rotates with a mixing action.

According to another aspect of the present disclosure, there is provided a kitchen appliance for processing content, the kitchen appliance comprising:
 a body portion;
 a removable accessory received by the body portion, the removable accessory being in contact with the content during processing thereof;
 at least one sensor incorporated into the removable accessory;
 a wireless transmitter associated with the removable accessory, the transmitter receiving input from the at least one sensor and transmitting parameters associated with the input; and
 a controller in the body portion for controlling operation of the kitchen appliance based upon the data,
 wherein the removable accessory is a container.

According to yet another aspect of the present disclosure, there is provided a kitchen appliance for processing content, the kitchen appliance comprising:
 a body portion;
 a removable accessory received by the body portion;
 a transmitter assembly adapted to cooperate with the removable accessory, for identifying the removable accessory, and for transmitting data associated with an identity of the removable accessory; and
 a receiver associated with the body portion for receiving the data associated with the identity.

Other aspects of the invention are also disclosed.

BRIEF DESCRIPTION OF THE DRAWINGS

One or more embodiments of the present invention will now be described with reference to the drawings, in which.

DESCRIPTION OF EMBODIMENTS

In order to measure a property of food or beverage as accurately as possible during the preparation of that food or beverage, it is advantageous for the one or more sensors being used to sense that property of the food or beverage to be in close proximity to the food or beverage being prepared. Ideally the sensors should be in contact with the food or beverage during the preparation thereof. However, consider for example measuring the temperature of the content of a stand mixer. Inserting a temperature probe into the content while the content is being mixed by a beater is challenging as the temperature probe would typically interfere with the beater's motion.

One solution proposed herein is incorporating sensors into the bowl within which the content is being mixed or processed. However, such bowls are removable, making connection and powering of such sensors difficult and susceptible to damage under high loading of the bowl. Another solution proposed herein is incorporating sensors into the attachments used for processing the content. However, those attachments are not only removable, but also rotate at high speeds. In addition, the rotation of the attachments is often accompanied by complex planetary mixing actions.

Figure 1A:
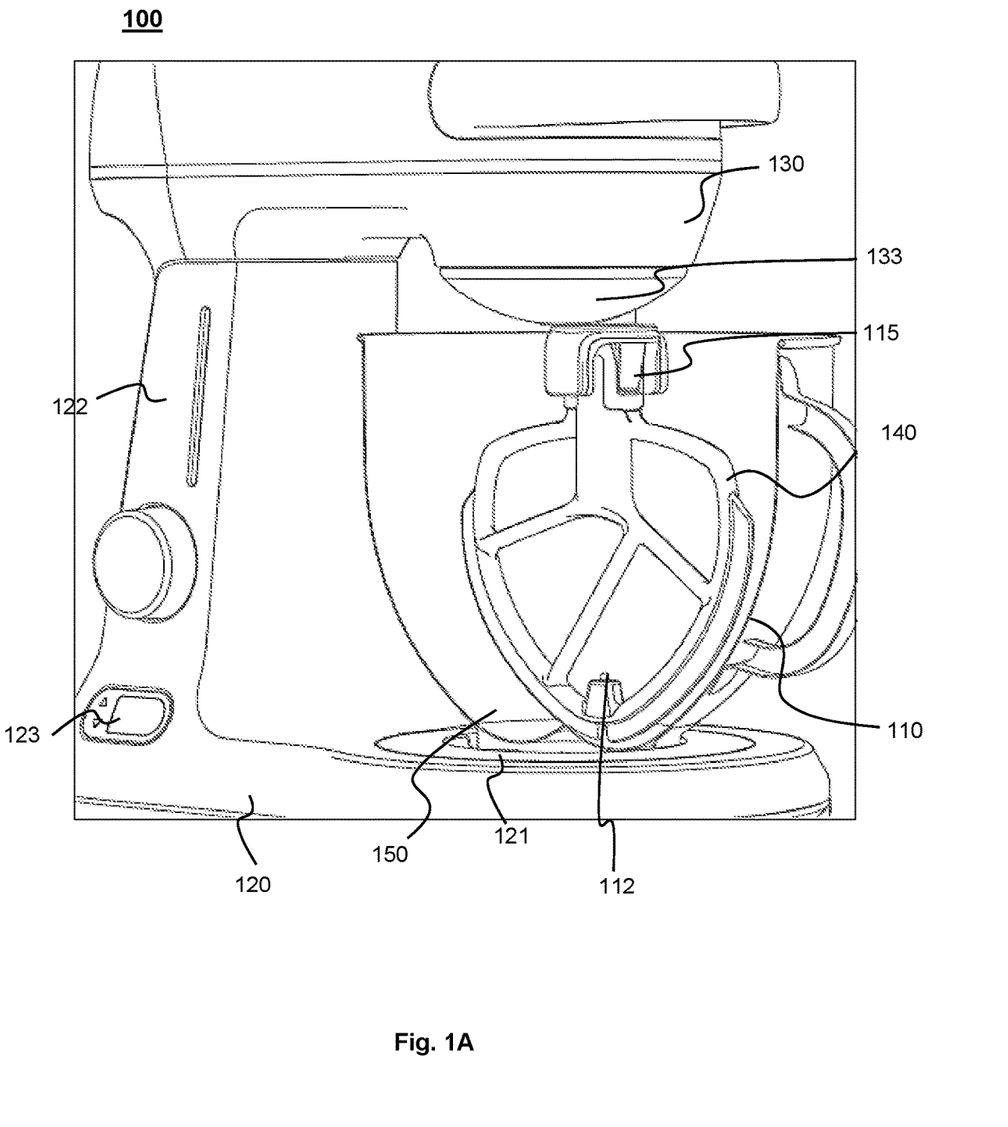
FIG. 1A shows a side view of a stand mixer according to the present disclosure.
Figure 1B:
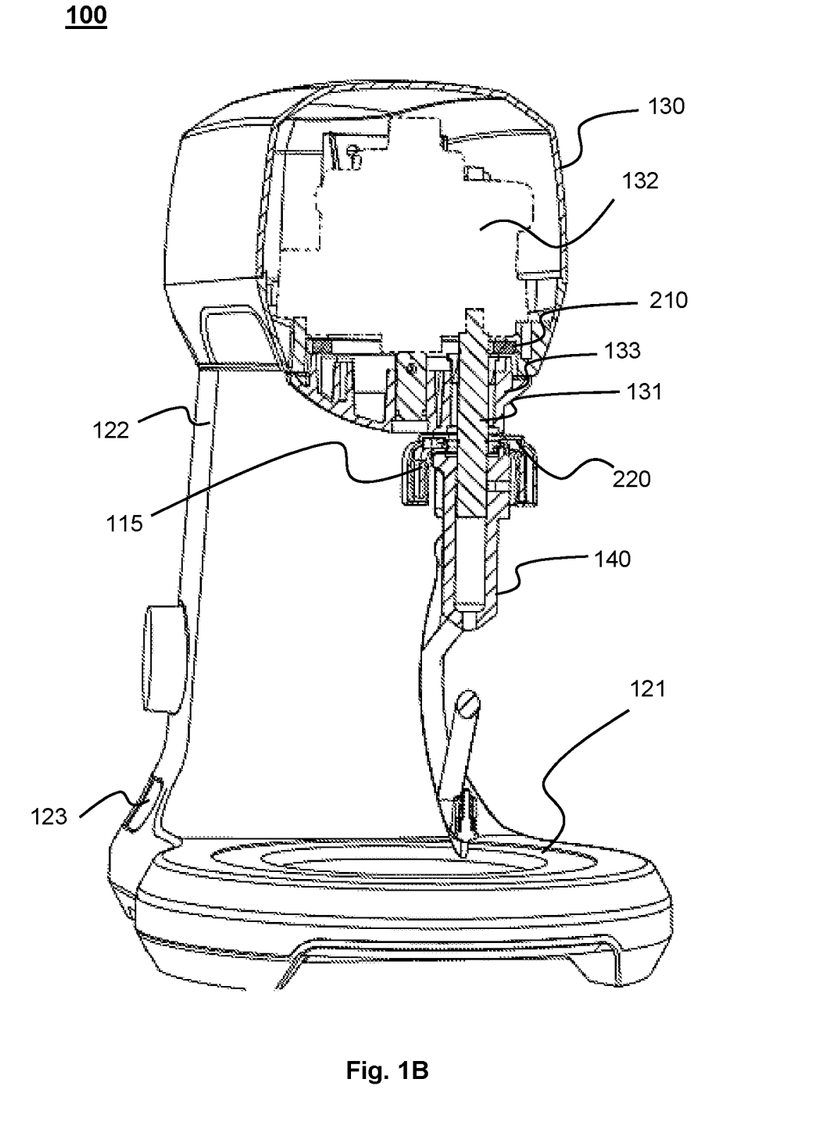
FIG. 1B shows a sectional view of the stand mixer 100 shown in FIG. 1A

FIG. 1A shows a side view of a stand mixer 100 according to the current disclosure. FIG. 1B shows a sectional view of the stand mixer 100 shown in FIG. 1A. The stand mixer 100 has a pedestal 120 having a base 121 for supporting a mixing bowl 110, and an upright portion 122 for pivotally supporting a head assembly 130 of the stand mixer 100. The head assembly 130 houses an electric motor and drive system 132. The head assembly 130 also has a rotating head 133 and a drive shaft 131 extending therefrom, overhead of the bowl 110.

Different attachments are removably attachable to the drive shaft 131. The attachment shown in FIGS. 1A and 1B is a beater 140. When attached, the attachment is suspended into the bowl 110 from the drive shaft 131. In the example described in relation to FIGS. 1A and 1B, the stand mixer 100 is a planetary mixer which operates to impart a planetary mixing action to the attachment 140. In alternative embodiments, the stand mixer 100 can be a non-planetary mixer and impart a different (non-planetary) type of mixing action to the attachment 140, for example a spiral mixing action or the like.

The drive shaft 131 and rotating head 133, when driven by the electric motor and drive system 132, imparts a planetary mixing action to the attachment in the example described in relation to FIG. 1A. Each attachment has special features, allowing a wide variety of tasks to be performed by the stand mixer 100, including whisking, beating, dough kneading, etc.

The base 121 includes a heating means (not shown) for heating the bowl 110, which in turn transfers that heat to the content 150 of the bowl 110 whilst that content is being subjected to the planetary mixing action. In the preferred implementation the heating means uses induction heating to heat the bowl 110 containing a ferromagnetic metal, such as magnetic stainless steel. More particularly, coils (not shown) are incorporated into the base 121, and when energized, those coils induce eddy currents in the base of the bowl 110, causing the bowl 110 to heat. Other methods of heating the bowl may also be used. The heating means referred to herein is able to heat the bowl 110 to any temperature from ambient up to 180 degrees Celsius.

The stand mixer 100 further includes one or more temperature sensors 112, such as negative temperature coefficient (NTC) sensors, for sensing the temperature of the content 150 of the bowl 110. Advantageously the temperature sensors 112 are incorporated within the attachment. The attachment may be made of a plastics material, allowing the temperature sensors 112 to be moulded within the attachment. The attachment may also be diecast in the manner described below with reference to FIG. 3A. In use the temperature sensors 112 are not only in contact with the content 150, but also move through the content 150 following the planetary mixing action, thereby sensing the temperature throughout the content 150 to permit accurate temperature measurements to be made.

The upright portion 122 of the pedestal 120 further includes a user interface 123 for receiving user settings, including mixing speed, temperature and mixing and/or heating times. A microprocessor based controller (not shown) is also provided for controlling the operation of the stand mixer 100. More particularly, the controller uses user settings received through the user interface 123 and input from sensors, including the temperature sensors 112, to control the electric motor (i.e. motor speed and operation period) and the heating means (i.e. temperature and duration of heating).

Speed and/or temperature profile controls are also provided by which the speed and/or temperature settings change over time. For example, a "slow start" control causes the speed setting to be low initially, and causes the speed setting to gradually increase to the speed set by the user. Similarly, a "slow heat" control causes the temperature of the content to slowly increase to the user set temperature.

The controller has stored therein pre-programmed cooking operations which may be selected through the user interface 123 to cause the stand mixer 100 to perform a series of pre-determined operational cooking and mixing sequences without requiring the user to input all of the individual instructions. The controller may use one or more measured food characteristics (such as the measured temperature), lapsed food preparation time, or a combination of both to advance through the sequence.

The temperature sensed by the temperature sensors 112 is transmitted wirelessly, for example by means of infrared and/or radio frequency communication, such as using the Bluetooth protocols. Accordingly, the attachment (i.e. the beater 140 shown in FIG. 1A) includes or attaches to a transmitter 115, the transmitter 115 receiving input from the temperature sensors 112.

In a preferred embodiment, the wireless transmitter includes a processor (e.g. microcontroller) and is not positioned with the temperature sensor on the main mixing body of the mixing attachment. Instead, the electronics of the transmitter and its processor are positioned to reduce the effects of centripetal force of the rotating attachment, to avoid the transfer of force and strain of the attachment as it rotates with a planetary mixing action, and to separate the electronics from the heat source and heated bowl contents which may have a temperature as high as 70, 100 or even 180 degrees Celsius (i.e. possibly detrimental to standard electronic components). To achieve this, the electronic components are positioned as close to the axis of rotation as possible (i.e. against the spindle, or drive shaft 131), and also positioned up towards the head assembly away from the heat source and heated bowl. In addition, the transmitter and processor electronics are positioned between the mixing attachment and the head assembly in a manner that isolates or buffers the electronics from the torsional forces experienced by the mixing attachment resulting from the rotating and planetary action. In one embodiment, this is done by attaching the electronics to the neck of the mixing attachment seated in a buffering material such as a soft silicone, e.g. RTV silicone. Another embodiment is described elsewhere herein with reference to FIGS. 3A-3D.

In one implementation the head assembly 130 includes a receiver (not shown) incorporated therein, the receiver communicating the sensed temperature to the controller. In another application the transmitted data is received by a remote computer device (not shown), such as a smartphone or a tablet computer, where the data is user in an application, such as a recipe composer application. The remote computer device may also issue control instructions to the controller of the stand mixer 100, with those control instructions being issued based upon the data received from the transmitter 115.

Figure 2:
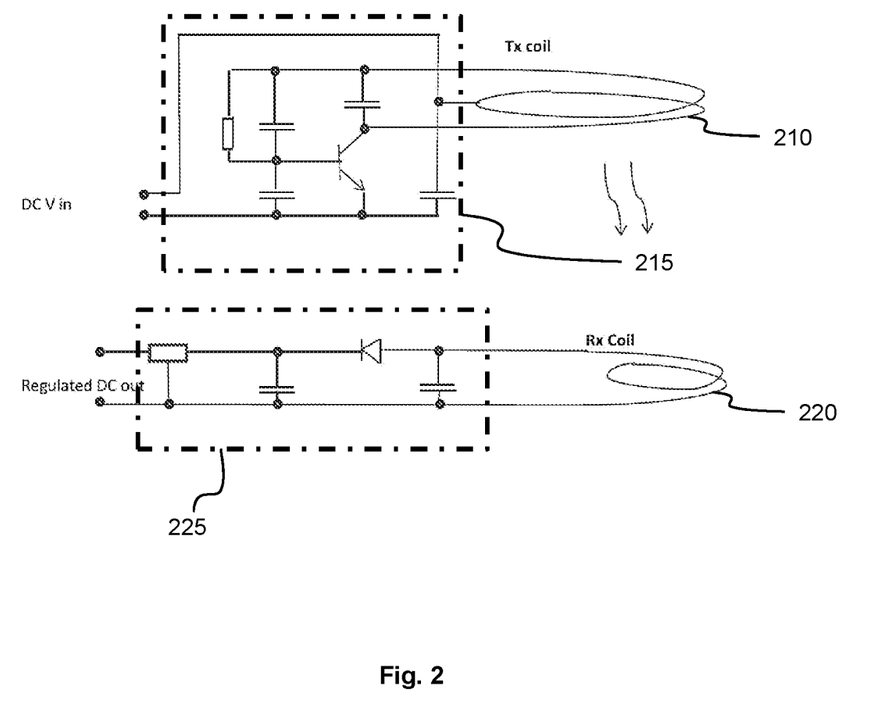
FIG. 2 shows a schematic block diagram of the preferred implementation of wireless power transfer used in the stand mixer shown in FIG. 1A.

In a preferred implementation the transmitter 115 and associated circuitry are powered using wireless power transfer (WPT) from the head assembly 130. FIG. 2 shows a schematic block diagram of the preferred implementation of WPT used, wherein the head assembly 130 (FIG. 1B) includes a primary coil 210 positioned proximal the rotating head 133, and the attachment includes a secondary coil 220 arranged around the aperture for receiving the drive shaft 131. An oscillator circuit 215 generates a high frequency alternating current to drive the primary coil 210. The coils 210 and 220 are inductively coupled to induce an alternating current in secondary coil 220. The induced alternating current is rectified and regulated by rectifier circuit 225 to supply a regulated direct current voltage to the transmitter 115 and associated circuitry.

An alternative form of WPT (not illustrated) that may be used includes a magnet array in the head assembly 130, and a magnetic winding in the attachment. The magnet array may be either stationary or rotating. When the attachment is rotated by the drive shaft 131, a voltage is induced in the winding. That voltage is regulated and used to power transmitter 115 and associated circuitry.

Figures 3A, 3B:
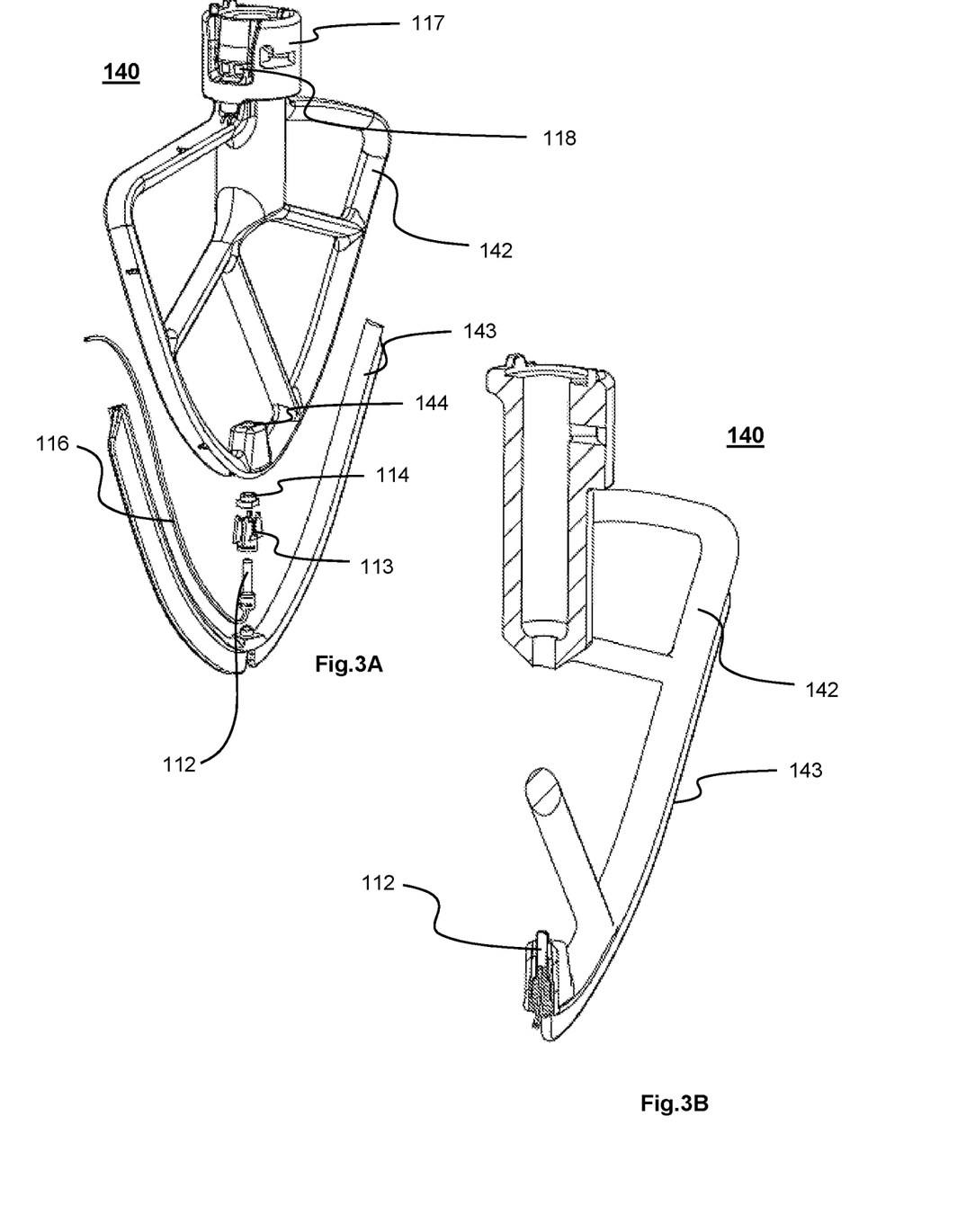
FIG. 3A shows an exploded view of the beater shown in FIG. 1A.
FIG. 3B shows a sectional view of the beater shown in FIG. 3A.

FIG. 3A shows an exploded view of the beater 140 shown in FIG. 1A. FIG. 3B shows a sectional view of the beater 140. The beater 140 mainly includes three portions, those being a body 142, a scrapper 143 and sensor assembly. The body 142 of the beater 140 is preferably made from a copolyester, such as Tritan™, whereas the scrapper 143 is preferably moulded from a thermoplastic elastomer, such as Hytrel®.

The sensor assembly includes the temperature sensor 112, a frame 113 for supporting the sensor 112, and a seal 114 for preventing foodstuff from entering the frame 113. The seal 114, frame 113 and sensor 112 are received in an aperture 144 moulded in the body 142. Wires 116 lead from the sensor 112, nested in a channel formed between the body 142 and the scrapper 143, to a head assembly 117.

As is evident from FIG. 3B, the sensor 112 protrudes from the frame 113 when assembled, thereby allowing the sensor to be in direct contact with the content 150 in use. In the implementation shown, the beater 140 includes only a single temperature sensor 112, but as would be understood, any number of temperature sensors may be included.

Figures 3C, 3D:
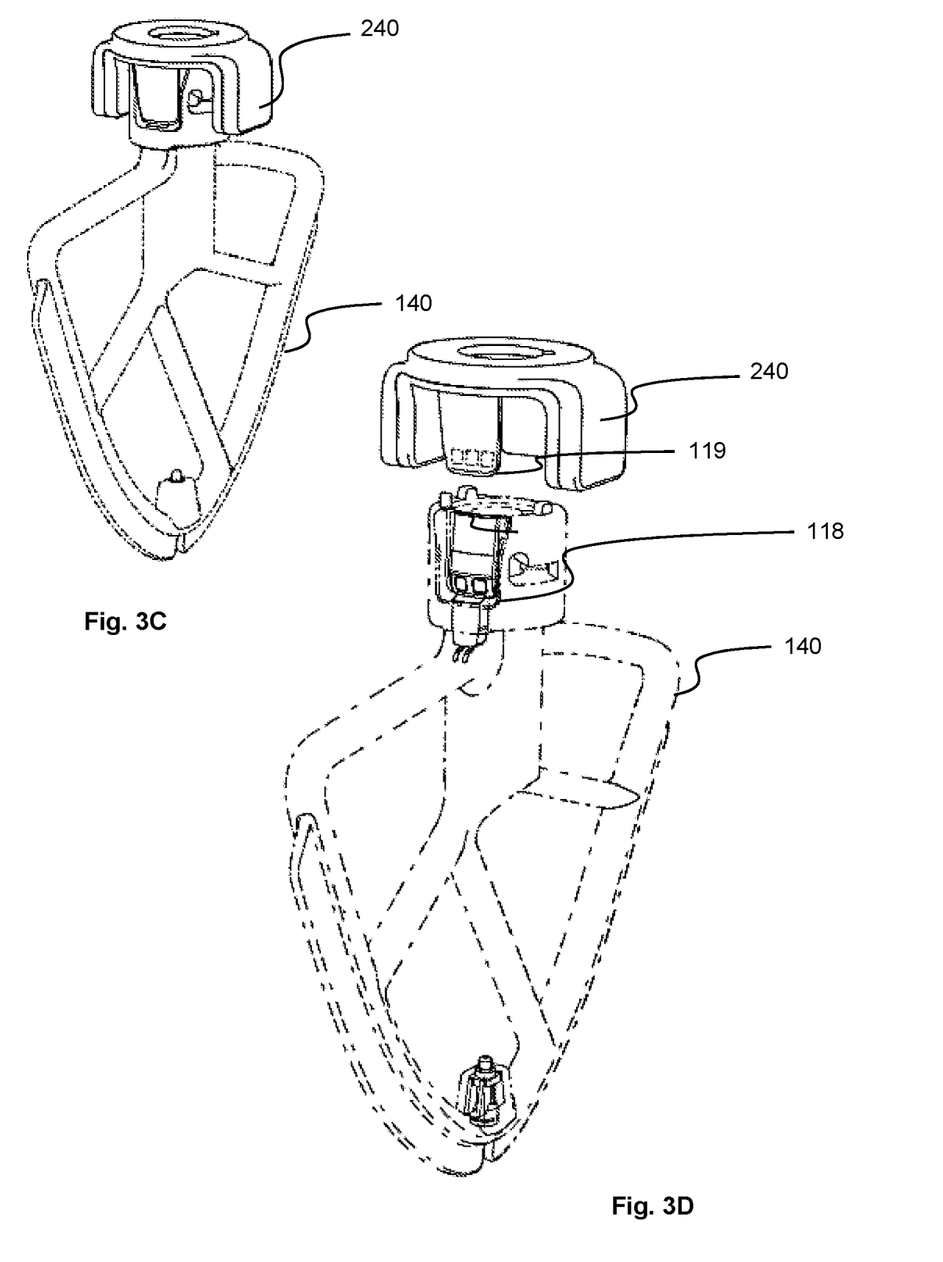
FIGS. 3C and 3D show a detachable transmitter assembly and the manner in which the transmitter assembly attaches to the beater shown in FIG. 3A.

The head assembly 117 either contains the transmitter 115 or, as in the implementation shown, has contacts 118 for contacting the wires 116 to a detachable transmitter assembly 240. FIGS. 3C and 3D show the detachable transmitter assembly 240 and the manner in which the transmitter assembly 240 attaches to the beater 140. The detachable transmitter assembly 240 includes contacts 119 for contacting the contacts 118 of the wires 116 (FIG. 3A), the transmitter 115 (FIG. 1B), the secondary coil 220 (FIG. 1B), and associated circuitry (not shown).

The transmitter assembly 240 is preferably removable from the rotating head 133, as described in relation to FIG. 3D. Nonetheless, in alternative embodiments, the transmitter assembly 240 can be assembled fixedly to the rotating head 133. The transmitter assembly 240 being assembled fixedly to the rotating head 133 allows the attachment 240 to couple with the transmitter assembly 240 and shaft, but does not allow the transmitter assembly 240 to be removed from the rotating head 133.

Figure 4:
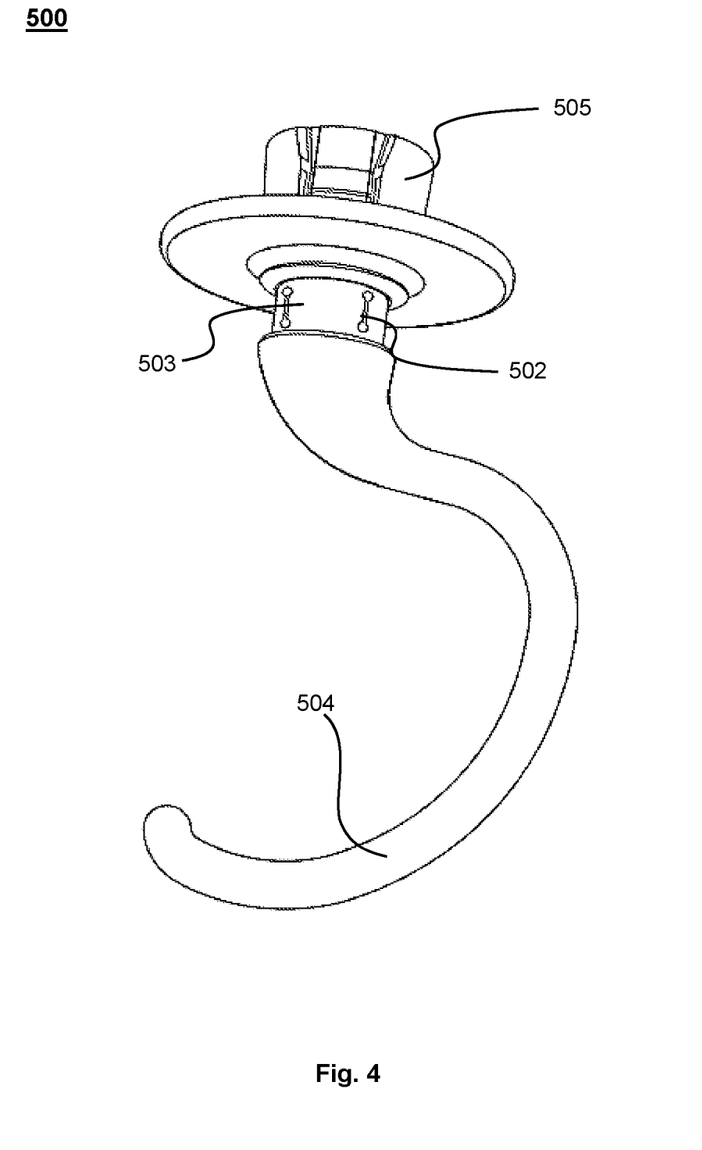
FIG. 4 shows a dough hook as an example of an alternative attachment including load cells.

The description above makes specific reference to temperature sensors 112. However, other sensors may additionally or alternatively be incorporated within the attachment. For example, one or more load cells may be added to the mixing attachment. FIG. 4 shows a dough hook 500 including load cells 502 attached to an upright portion 503 situated between a hook 504 and the attachment 505 for attaching to the shaft 131 of the mixer 100. The load cells 502 measure bending forces experienced by the upright portion 503. Those bending forces are indicative of the viscosity or hardness of the content 150.

A moisture sensor on the mixing attachment may be used to provide information on moisture and pH as a food characteristic, and also moisture as an indication of level/volume. A moisture sensor or array of moisture sensors may also be positioned along the inside of the mixing bowl 110, from top to bottom (comparable to a conventional printed volume indicator), thereby being able to sense the level (and therefore volume) of contents in the mixing bowl 110.

Similarly, a level sensor positioned along the length inside the mixing bowl 110 may be used to provide information on volume and volume change.

The power induced in the attachment may also be used for other purposes. For example, light emitting diodes may be placed on the attachment to illuminate bowl content 150, providing visual feedback to the user. Also, the attachment may be heated, for example a beater 140 used to melt chocolate.

Figures 5A, 5B:
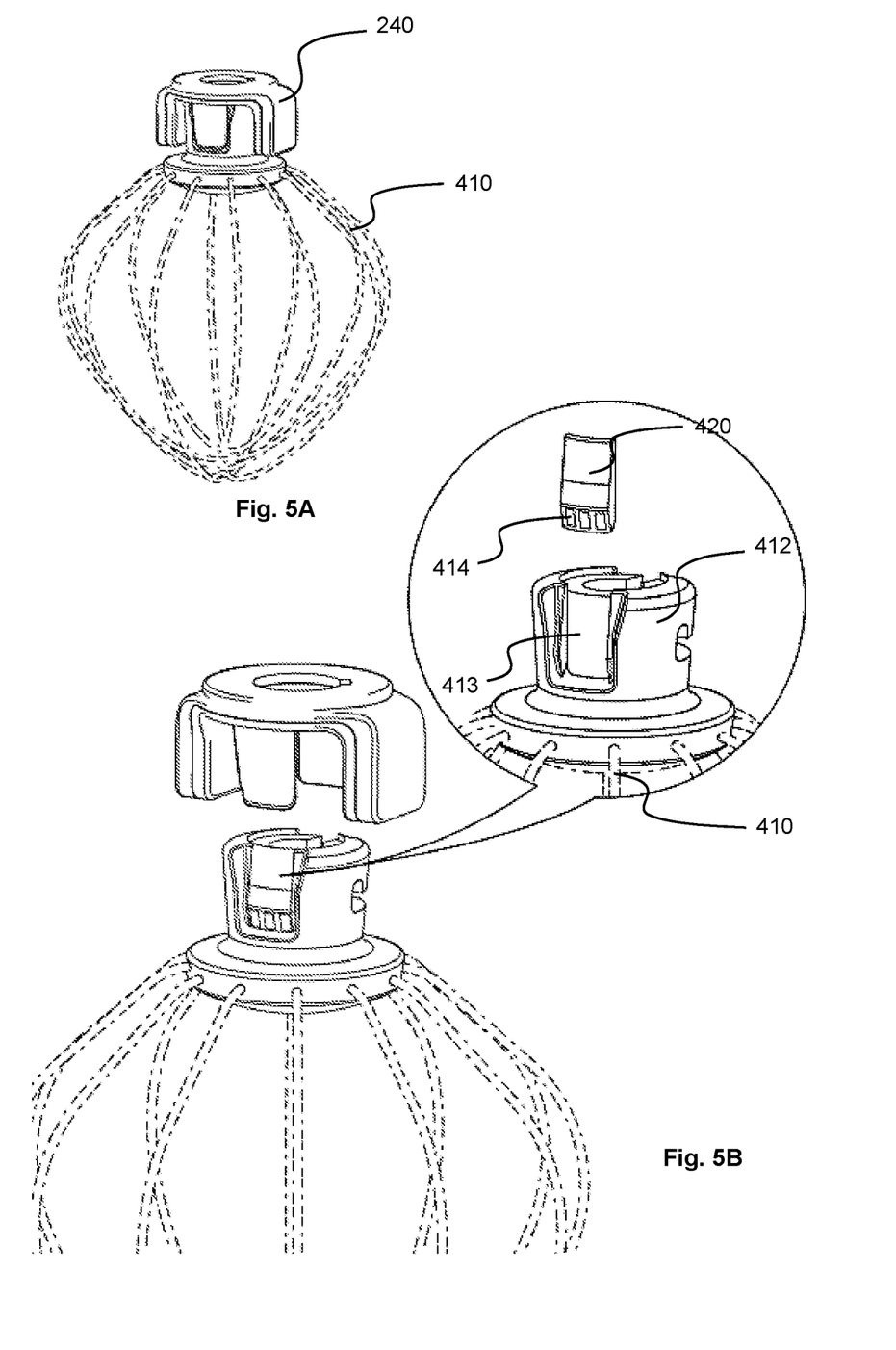
FIG. 5A shows an attachment having a removable universal identifier and data transmitter attached thereto.
FIG. 5B shows a bayonet collar of an attachment and the universal identifier and data transmitter assembly removed from the attachment.

In a preferred implementation the attachments of the stand mixer 100 include attachment identification. FIG. 5A shows an attachment in the form of a whisk 410 having a removable universal identifier and data transmitter assembly 430 attached thereto. As is described in more detail below, the removable universal identifier and data transmitter assembly 430 identifies the type of attachment it is attached to, that being a whisk 430 in the illustrated case, and transmits data associated with that identity to a receiver (not shown) in the stand mixer 100.

FIG. 5B shows only a bayonet collar 412 of the whisk 410 for attaching to the shaft 131 (FIG. 1A) of the mixer 100, and the universal identifier and data transmitter assembly 430 removed therefrom. As is illustrated in the insert of FIG. 5B, the collar 412 has a slot 413 for receiving an identifier part 420 having contacts 414 moulded therein. In use the removable universal identifier and data transmitter assembly 430, when attached to the removable attachment (i.e. the whisk 410 in the illustrated example), uses the configuration of the contacts 414 on the identifier part 420 to identify the type of attachment.

The array of contacts 414 is adapted to encode an identity for the type of attachment. One method of coding is by using a binary code. For example, if 3 contacts 414 are used, then $(2^{(3-1)})=4$ different types of attachments may be identified depending on the presence or absence of the contacts 414 as one of the contacts 414 acts as a reference ground connection. Other encoding mechanisms may also be used, such as buttons, magnets, etc., with a suitable sensor arrangement positioned on the transmitter assembly 430 for sensing the encoding mechanism.

Data associated with that identity of the attachment is transmitted to the mixer 100. The removable universal identifier and data transmitter assembly 430 is preferably powered using WPT in a manner described with reference to FIG. 2.

The controller of the mixer 100 may use the identity of the type of attachment 410 being used, for example, to set the maximum speed or speed intervals available for use by the user. Additionally or alternatively, in the event where the controller provides recipe information, and/or appliance control based on the recipes, the group of recipes provided to the user (e.g. via the user interface 123 of the mixer 100, or via an associated application on the remote computer device) may be determined based on the attachment in use. For example, if the attachment is identified to be a dough hook, dough recipes are provided on a recipe application associated with the stand mixer 100 so that the user can select one of those recipes to be executed. Some recipes may require more than one accessory to be used.

In the description above the sensors are placed on attachments that rotate relative to the stand mixer 100, such as beater 140 and whish 410. Also described are sensors place on "attachments" that do not rotate in use, such as adding sensors to the inside of the bowl 110 to measure properties of the content 150 of the bowl 110 while being in contact with the content 150.

Also, the above description describes the stand mixer 100 in detail. However, one of ordinary skill in the art would appreciate that the disclosure above may equally be implemented in a large selection of other possible kitchen appliances. For example, the disclosure above may equally be implemented in food processors, or in blenders whether heated or not, and more particularly having sensors inside a removable container. Also, the disclosure above may equally be implemented in ice cream makers and bread makers, with sensors applied either to a bowl or bread pan respectively, or to attachments mixing the content.

In a preferred implementation the kitchen appliance includes the ability to "play back" a sequence of user or default factory settings. The parameters associated with certain food characteristics that are sensed by the sensors in direct contact with the content of the kitchen appliance may be used as an input to controlling the play back.

For example, in a heated mixer, if the ingredients need to be heated to a certain temperature during a recipe step, then the controller of the appliance determines when to transition from one recipe step to the next based on the measured temperature derived from the sensors. One reason why current kitchen appliances do not provide this functionality is because the temperature cannot be measured accurately enough in an appliance that has a moving mixing or blending attachment. This is at least in part because temperature sensors are positioned outside the container, either because of the difficulties in using a temperature probe when there is a moving blade or mixer, or because fixed sensors inside the container (in direct contact with the contents of the container) have not been considered either feasible or useful for kitchen appliances.

However, the present inventors have found that measuring characteristics of the content being mixed or processed is not only possible (e.g. by incorporating the sensors in a position where the food is contacted), but can also be done accurately because a sensor positioned on a moving blade or mixing attachment is, under some processing circumstances, more likely to provide an accurate measurement (e.g. as opposed to measuring "cold spots" or "hot spots" of heated food contents.) In addition, the measured characteristic(s) can be used in the direct feedback to the controller that controls operation of the kitchen appliance (e.g. temperature measurements that provide feedback to a heating controller), but can also be used as a useful data input to a recipe play back functionality.

The controller of the mixer 100 uses temperature data received from the temperature sensors 112 positioned on the beater 140 as feedback to control the temperature of the content 150. Preferably the mixer 100 also includes one or more temperature sensors (not illustrated) associated with the bowl, allowing the temperature of the bowl that is being heated also to be measured. Temperature measurements taken with the bowl temperature sensor(s) are also used as feedback to the controller. The controller uses the different temperature measurements to calculate a rate of change, and then relies on equilibrium or steady state temperature values (i.e. once the rate of change drops below a certain threshold). Because the sensors 112 on the beater 140 move around the content 150 that is being heated and has pockets of different temperatures, the sensed temperatures are initially variable. For this reason, the controller determines a steady state before relying on those measurements. In addition, the measured values may be averaged over time, over predefined time intervals, or over time once a steady state temperature is approached.

Below follows a few examples of measured parameters that provide an input to an appliance controller for determining progression from one recipe step to another.

Figure 6A:
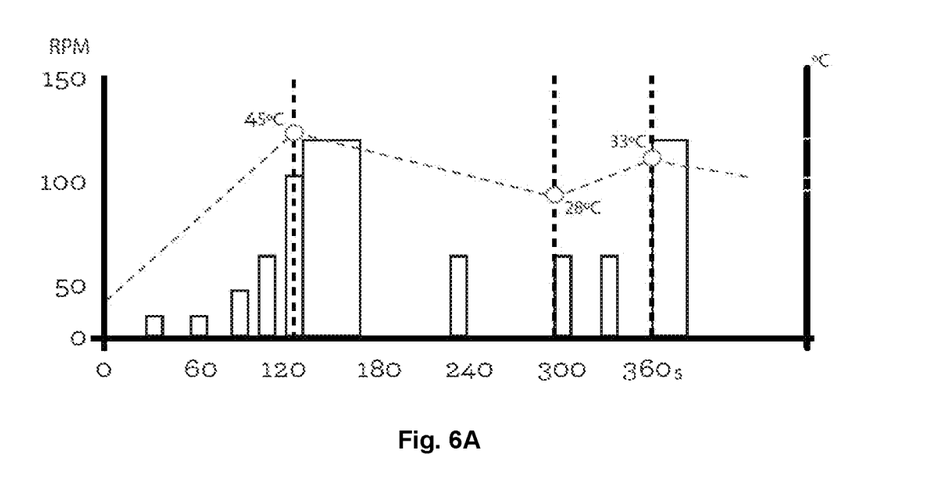
FIGS. 6A and 6B show examples of a preparation profile recorded on a bench mixer while tempering chocolate.

In a first example the appliance is a heated bench mixer, and the heated bench mixer is used for tempering chocolate. The process of tempering chocolate is used to ensure a smooth surface and consistent texture of chocolate by managing the crystallization of the cocoa butter. FIG. 6A shows an example of a preparation profile (i.e. agitation speed) recorded on the bench mixer. More particularly, the preparation profile is used for tempering a small amount of chocolate.

As shown in FIG. 6A, the chocolate has an initial temperature of approximately 20 degrees (room temperature) at time 0. The bench mixer sets the heating temperature to around 45 degrees at time 0, and based on a small amount of chocolate the set temperature is predicted to be reached at around 120 seconds. During this initial heating stage, the bench mixer also agitates the contents of the mixing bowl 5 times, at speeds ranging between 25 and 100 RPM.

Once the chocolate melting temperature of approximately 45 degrees has been reached, the preparation profile at time 120 seconds includes a 50 second medium speed (120 RPM) agitation period used to mix the melted chocolate well. If seed chocolate (room temperature well-tempered chocolate) is added at this stage, this mixing section will incorporate that seed chocolate into the melted chocolate. At 120 seconds, heating is switched off so that the melted chocolate can cool down to room temperature. With the temperature sensor on the mixing accessory immersed in the melted chocolate, the bench mixer is able to sense when room temperature is approached.

At around 240 seconds, the mixer agitates the cooling chocolate to ensure an even consistency of the cooling chocolate. By moving the mixing accessory around in the cooling chocolate, the temperature sensor is also better able to sense the average temperature throughout the cooling chocolate (as opposed to the temperature at one specific place in the mixing bowl).

Based on a small amount of chocolate, in this example the predicted cooling time lasts until 300 seconds. At around this time, the immersed sensor senses that the cooling chocolate is approaching room temperature, and the heated bench mixer sets the set temperature to 28 degrees to ensure that the cooling chocolate does not begin to recrystallise. Once the sensor senses that the cooling chocolate has reached approximately 28 degrees, the mixing accessory once again is set to agitate the chocolate for 10 seconds at about 60 RPM to improve the reliability of the sensed temperature.

If room temperature (28 degrees) has been reached, the bench mixer then changes the set temperature to 32 degrees (±1 degree) to ensure that the chocolate is heated and maintained in a range of 31-33 degrees so that appropriate crystallization of the cocoa fat will occur to temper the chocolate properly. As shown the set temperature is changed at around 300 seconds, and the second heating stage, commences. It will be appreciated that such accurate temperature control (±1 degree) is very difficult, if not impossible, if only the temperature of the surface of the bowl is measured, without using an in-food sensor. In addition, the regular and controlled movement of the sensor through the contents of the bowl further adds to the accuracy of the temperature measurements.

The set temperature is reached at around 360 seconds, after which the tempered chocolate is maintained within the 31-33 temperature range, and is periodically agitated to ensure the even distribution of temperature during the use of the tempered chocolate. This final stage is maintained for as long as the user requires the chocolate at this temperature during use, e.g. for 5-10 minutes, or 10-20 minutes.

The chocolate used may deviate from the assumed model, e.g. more than 100 grams is used, or characteristics of the chocolate may differ such as starting temperature of refrigerated chocolate, high cocoa solid content, or fat characteristics resulting in a higher melting point. If this happens, the preparation profile as shown in FIG. 1 will be adapted by the bench mixer based on sensor measurements taken during the preparation process.

For example, if the initial temperature of the chocolate is only 10 degrees, e.g. because the chocolate was refrigerated, then the bench mixer's heating means will operate with increased power. A possible consequence may then be that the melting chocolate temperature during the first heating stage, e.g. at 60 seconds, as well as the heating rate (as determined from successive measurements during Stage 1) are both higher than expected by the original preparation profile.

In the case of the sensed temperature being too high at a particular point on the preparation profile, the bench mixer is able to adapt the profile accordingly. Because the temperature is being measured continually with the immersed in-food sensor, feedback to the controller is provided in a timely fashion, enabling more control over the preparation process. In some embodiments the temperature sensor provides the controller with measured parameters continuously. In other embodiments, the temperature sensor provides the controller with measured parameters with a certain period, e.g. every 10 seconds, every 30 seconds, every minute, etc. In some embodiments the user is able to select the sensing period.

If a higher than expected temperature and, in this example, higher than expected heating rate are sensed, e.g. at around 60 seconds, the controller is able to adapt the operation of the heating means, e.g. by switching the heating means off before 120 seconds to cool the melted chocolate, for example at around 90 seconds. This way overheating of the chocolate may be prevented. Related to this, of course, is changing the time periods associated with the duration of the various stages. For example, if the ingredients overshoot the required temperature, then the controller of the bench mixer will change the operation of the bench mixer so that the cooling stage (between 120 seconds and 300 seconds in FIG. 6A) lasts longer as it takes longer for 28 degrees to be reached.

Figure 6B:
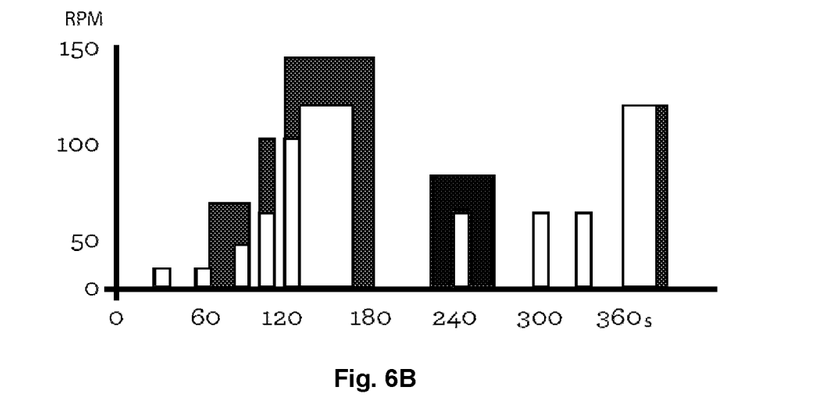

In the heated bench mixer, in addition to being able to change the temperature profile by modifying the operation of the heating means, the controller is also able to modify the operation of the mixing accessory. As illustrated in FIG. 6B, by increasing the rate and/or duration for the periods of agitation (as shown in black), the ingredients will be less likely to burn on the bowl wall, and agitating the ingredients more vigorously will promote cooling. Conversely, reduced motor speed will increase the time for ingredient heating if required. As mentioned, the cooling stage can also be extended if required for the melted chocolate to return to 28 degrees (with or without additional agitation).

In another example frozen desserts are made in an ice cream maker (e.g. sorbet, frozen yoghurt, gelato or ice cream). Such frozen desserts set at different times depending on the ingredients and hardness requirements. For example, in addition to the volume of dessert introduced into the ice cream maker, the amount of sugar in a mixture will greatly affect the rate in which the dessert mixture sets.

In the dessert mixture, it is preferable to add the mix-ins at a prescribed time. It is usually towards the end of a cycle to ensure that the churning action does not 'break down' or 'pulverise' the mix-in ingredients (e.g. soft fruits), but also have enough time to adequately mix the ingredients through the dessert mixture to allow for even distribution. Additionally, the ice cream maker should also ensure that the dessert mixture is not too 'frozen' as to allow the distribution of the mix-in ingredients. The ideal time could approximately be 1 minute prior to the completion of the dessert making cycle, for example.

Load cells on the mixing paddle of the ice cream maker determine the consistency of the mixture through deflection of the paddle arm resisting the load applied (which changes because of the changing viscosity of the ingredients), while temperature sensors on the mixing paddle and/or on the inside of the bowl of the ice cream maker determine the temperature of the dessert mixture. The additional information and accuracy of the sensed data allows the ice cream maker to better approximate the ideal time to introduce mix-ins or to complete the recipe.

Another example relates to an induction cooktop or a heated blender. If the quantity of ingredients is known (even to the extent of a look-up table when scaling recipes), the time to progress in a recipe would be prescribed. However, when the user places different amounts of ingredients to that prescribed in the recipe (including, for example, varying ratios of ingredients), or the temperature of the ingredients is different (for example, onions that have been stored in the fridge or ones stored at room temperature), sensed food characteristics are helpful in adapting recipe programs. A sensed temperature provides a useful input for recipe step progression as an alternative for time. For example, in a recipe that includes a step for sautéing onions, the controller will wait until the sensed temperature reaches 150° C. (for a time interval between 3 mins and a maximum of 15 mins) before proceeding to the next step.

Another example relates to a heated bench mixer. When preparing a mousse based on a "pate a bombe" recipe, a level sensor (or moisture sensor) may be used to assess when the eggs have been beaten sufficiently to add syrup (a timer may be used in conjunction with a level sensor). The level sensor will sense when the eggs have been volumised. The next step of whipping the sugar and eggs together will continue until the temperature sensor indicates that the mousse has cooled to around 40 degrees.

The foregoing describes only some embodiments of the present invention, and modifications and/or changes can be made thereto without departing from the scope and spirit of the invention, the embodiments being illustrative and not restrictive.

The invention claimed is:

1. A kitchen appliance for processing content, the kitchen appliance comprising:
   a body portion;
   a removable accessory received by the body portion, the removable accessory being rotatable about an axis of rotation;

a transmitter assembly adapted to cooperate with the removable accessory, to identify the removable accessory, and to transmit data associated with an identity of the removable accessory, the transmitter assembly being located separately from the removable accessory; and a receiver associated with the body portion for receiving the data associated with the identity; and wherein the removable accessory has an identifier part having a metal reference contact and zero, one, or more additional metal contacts, and wherein the transmitter assembly comprises a sensor arrangement for sensing the metal reference contact and the presence or absence of any of the additional metal contacts, a configuration of the zero, one or more additional metal contacts encoding the identity of the removable accessory; and wherein the transmitter is positioned in close proximity to, and rotates about, the axis of rotation of the removable accessory.

2. The kitchen appliance according to claim 1 wherein the removable accessory is die-cast having a nonconductive tab attached thereto, the nonconductive tab carrying the metal reference contact and the zero, one or more additional metal contacts.

3. The kitchen appliance according to claim 1 wherein the removable accessory comprises a collar, the collar carrying the metal reference contact and the zero, one or more additional metal contacts.

4. The kitchen appliance according to claim 1, further comprising a controller for controlling operation of the kitchen appliance based upon the identity, wherein the controller uses the identity to set a speed parameter and a heating temperature of the kitchen appliance.

5. The kitchen appliance according to claim 4 wherein the controller uses the identity to present to a user a group of recipes associated with the removable accessory.

6. The kitchen appliance according to claim 1, wherein the transmitter assembly is removable.

7. The kitchen appliance according to claim 1, and further including at least one sensor incorporated into the removable accessory.

8. The kitchen appliance according to claim 7, wherein the transmitter assembly is arranged to receive input from the at least one sensor and to transmit parameters associated with the input.

9. The kitchen appliance according to claim 1, wherein the removable accessory is a food processing attachment that rotates with a mixing action.

10. The kitchen appliance according to claim 1, wherein the metal contacts are adapted to encode the identity of the removable accessory by using a binary code.

11. The kitchen appliance according to claim 10, wherein the binary code is calculated based on the presence or absence of the metal contacts.

12. The kitchen appliance according to claim 11, wherein the binary code is calculated based on the formula:

$$2^{(x-1)}=y$$

wherein:
x=the number of metal contacts present; and
y=the number of different types of attachments.

13. A kitchen appliance for processing content, the kitchen appliance comprising:

a body portion;

a removable accessory received by the body portion, the removable accessory being rotatable about an axis of rotation;

a detachable transmitter assembly adapted to cooperate with the removable accessory, to identify the removable accessory, and to transmit data associated with an identity of the removable accessory, the transmitter assembly being located separately from the removable accessory; and a receiver associated with the body portion for receiving the data associated with the identity;

wherein the removable accessory has a metal reference contact and zero, one or more additional metal contacts, and the transmitter assembly comprises a sensor arrangement for sensing the reference contact and any additional metal contacts, a configuration of the one or more metal contacts encoding the identity of the removable accessory depending on the presence or absence of the additional metal contacts; and wherein the transmitter assembly is positioned in close proximity to the axis of rotation of the removable accessory.

* * * * *